United States Patent
Olsen

(10) Patent No.: US 8,397,891 B2
(45) Date of Patent: Mar. 19, 2013

(54) BRAZED SUPPORT RING

(75) Inventor: Steven Olsen, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 352 days.

(21) Appl. No.: 12/763,680

(22) Filed: Apr. 20, 2010

(65) Prior Publication Data

US 2010/0270118 A1 Oct. 28, 2010

Related U.S. Application Data

(60) Provisional application No. 61/214,671, filed on Apr. 27, 2009.

(51) Int. Cl.
*F16D 13/70* (2006.01)

(52) U.S. Cl. ..................... 192/107 R; 29/428

(58) Field of Classification Search ............... 192/3.28, 192/3.3, 107 R; 29/425, 428, 432, 432.2, 29/527.1
See application file for complete search history.

(56) References Cited

U.S. PATENT DOCUMENTS

| | | | |
|---|---|---|---|
| 2,640,373 A | 6/1953 | Jandasek | |
| 2,691,812 A | 10/1954 | Misch | |
| 2,821,867 A | 2/1958 | Kelbel | |
| 2,971,385 A | 2/1961 | Miller | |
| 4,020,937 A * | 5/1977 | Winter | 192/107 R |
| 4,572,345 A * | 2/1986 | Frietsch | |
| 4,874,350 A * | 10/1989 | Casse et al. | |
| 6,065,578 A * | 5/2000 | Nakatani et al. | 192/107 R |
| 7,063,197 B2 | 6/2006 | Merkel et al. | |

OTHER PUBLICATIONS

Mechanical Engineering Design, 7th ed. New York, McGraw-Hill, 2003. p. 464. TJ230.S5 2004.*

* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A support ring for a torque converter including first and second laminations, wherein each of the first and second laminations includes first and second opposite surfaces, wherein the first surfaces of the first and second laminations are matingly engaged and affixed together, and the second surfaces of the first and second laminations form a pair of external, opposite surfaces of the support ring, wherein the first surfaces of the first and second laminations each further comprise at least one hole, at least one protrusion, and wherein the at least one protrusion of the first lamination is engaged in the at least one hole of the second lamination, and wherein the at least one protrusion of the second lamination is engaged in the at least one hole of the first lamination.

11 Claims, 5 Drawing Sheets

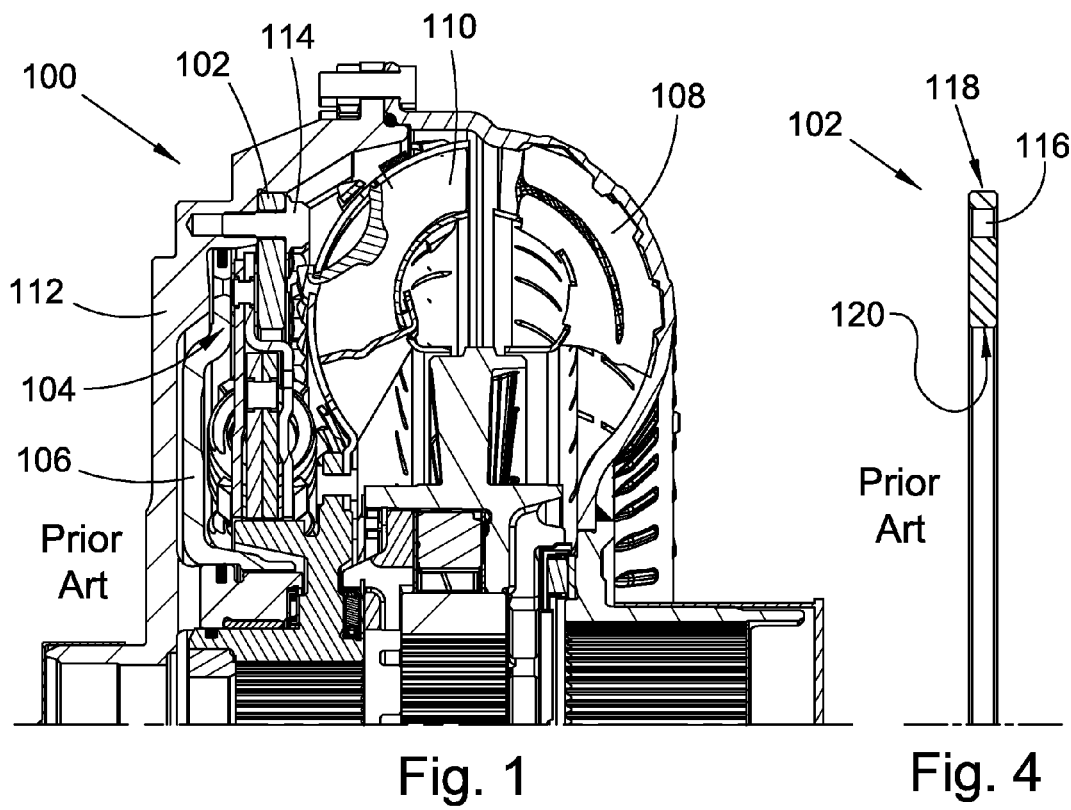
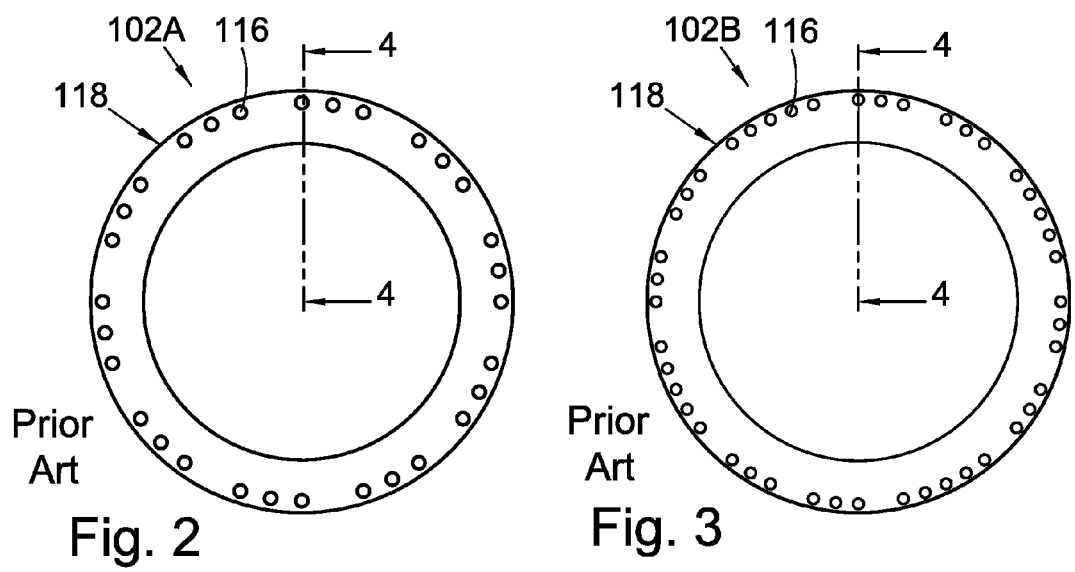
Fig. 1  Fig. 4  Fig. 2  Fig. 3

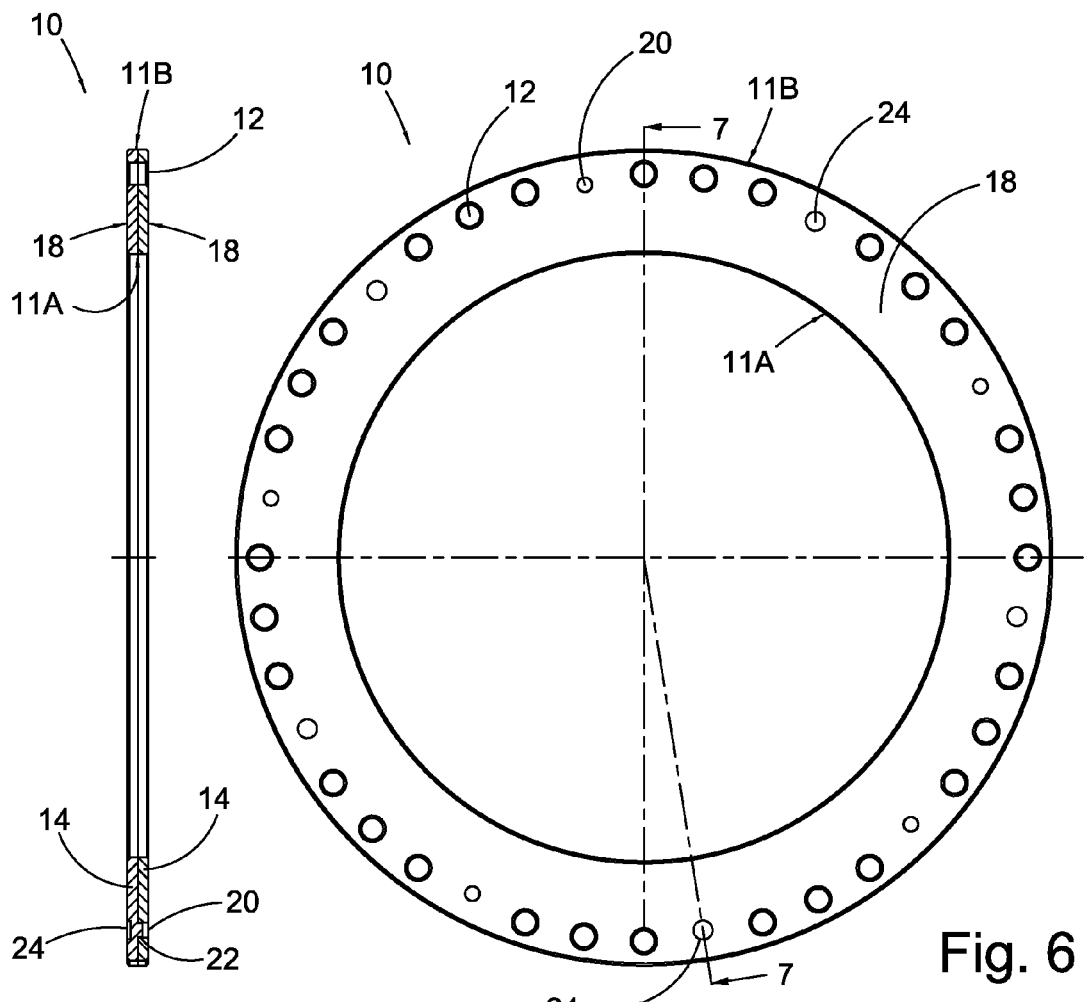
Fig. 6
Fig. 7
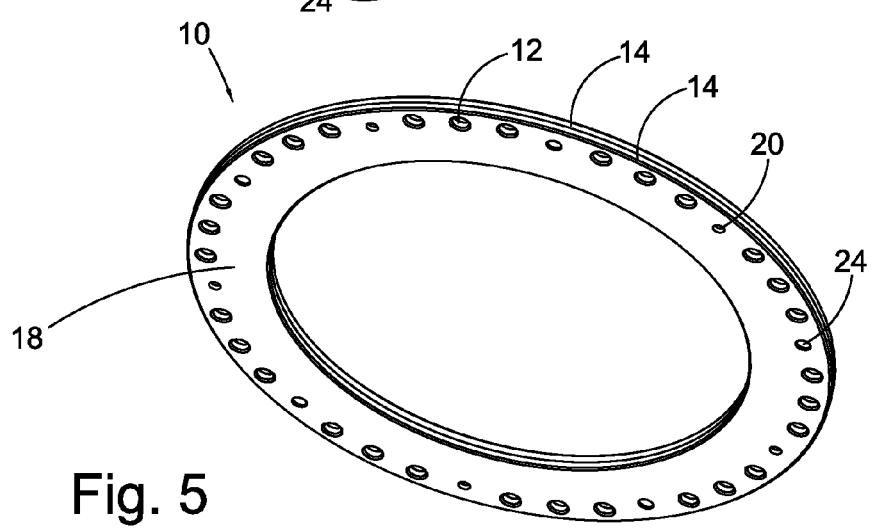
Fig. 5

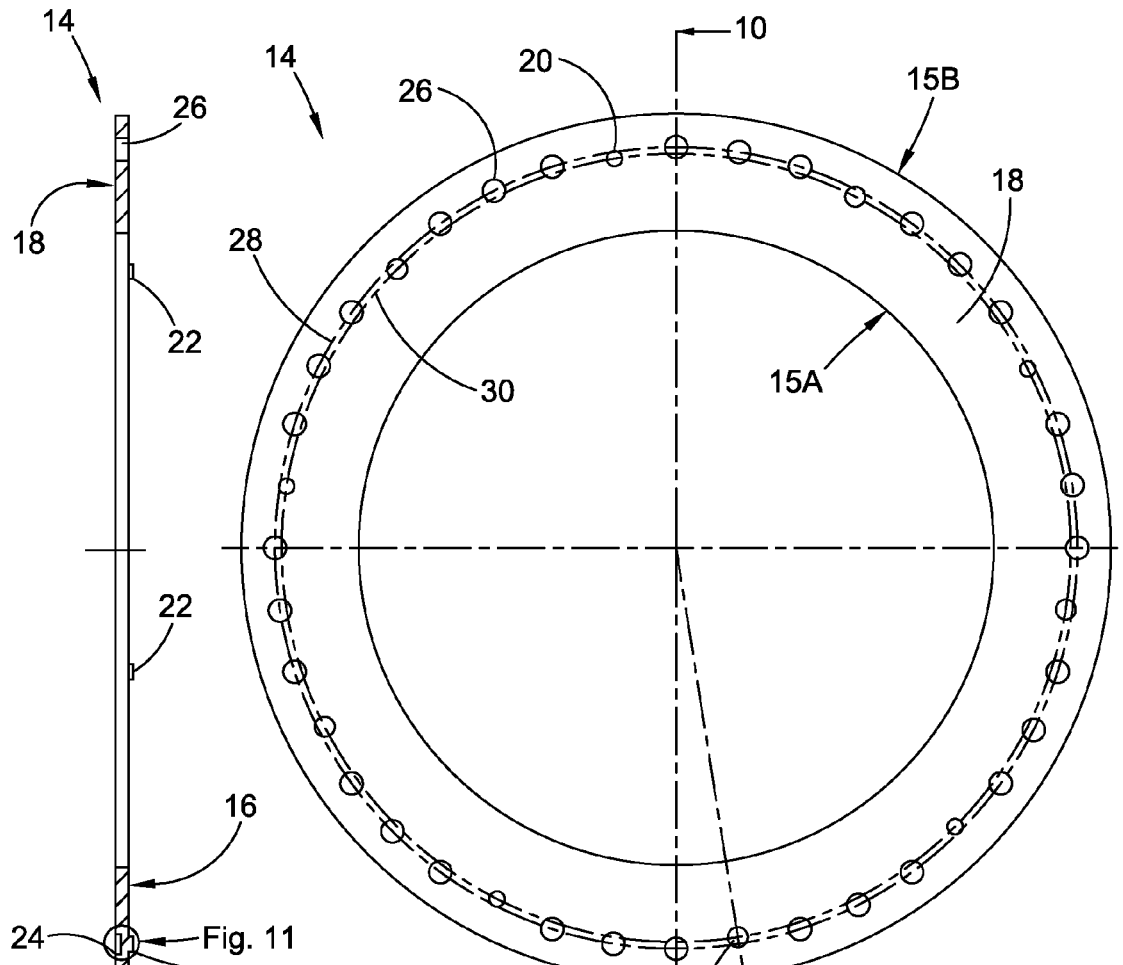
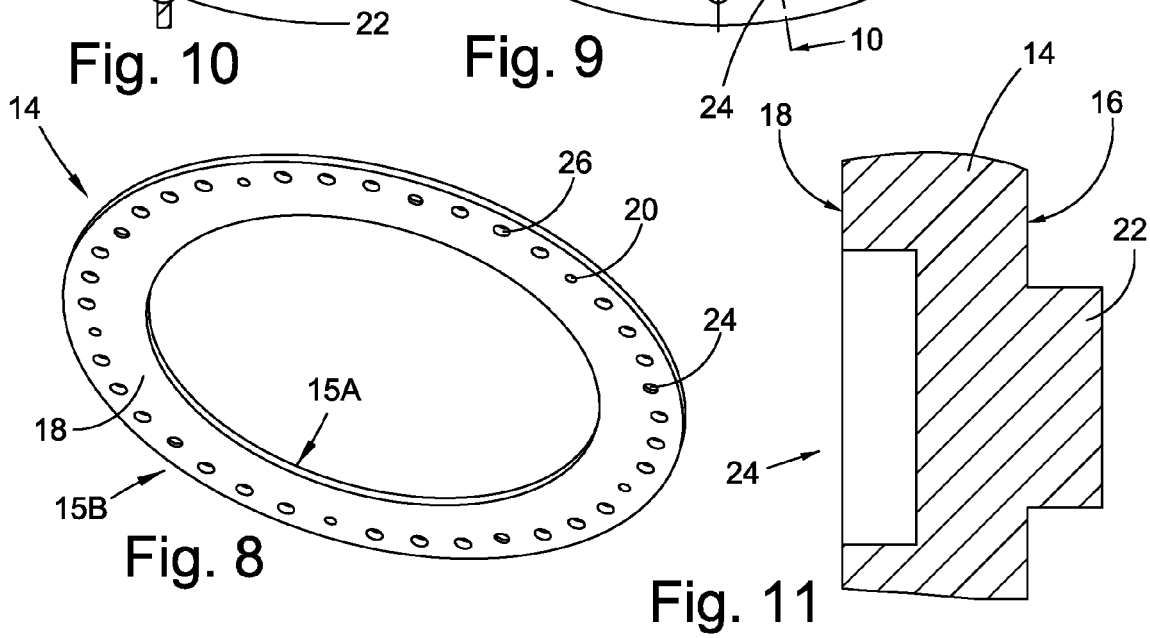

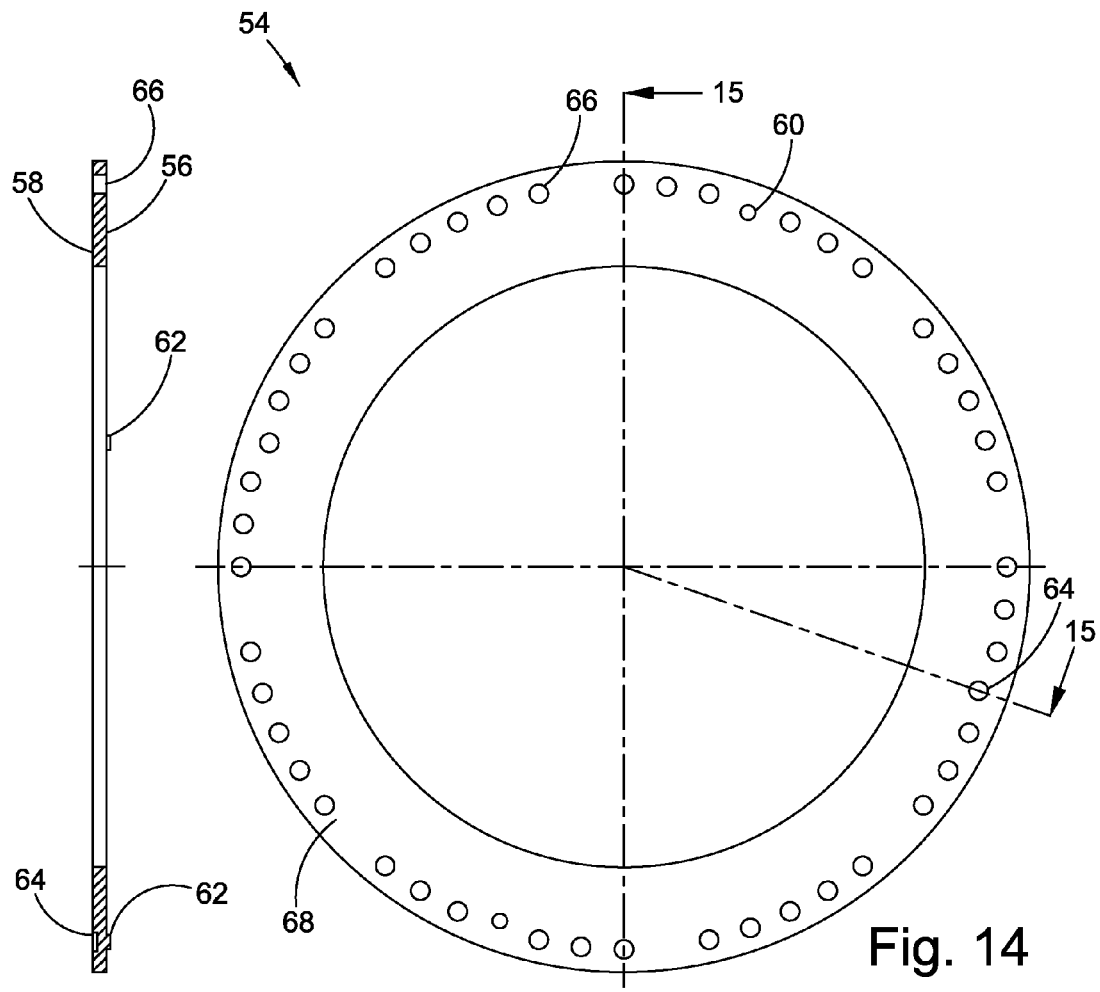
Fig. 14
Fig. 15
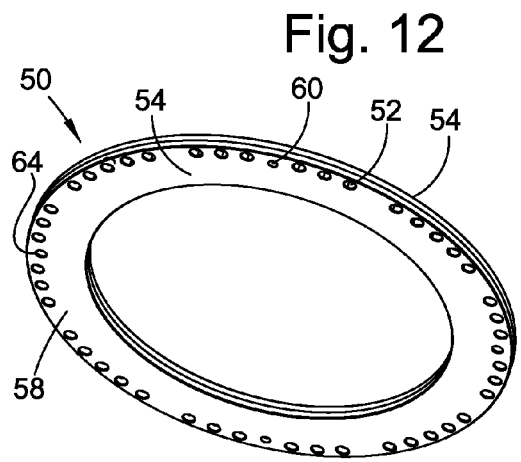
Fig. 12
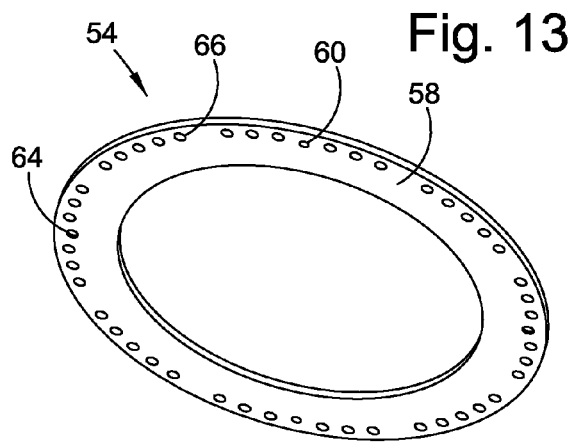
Fig. 13

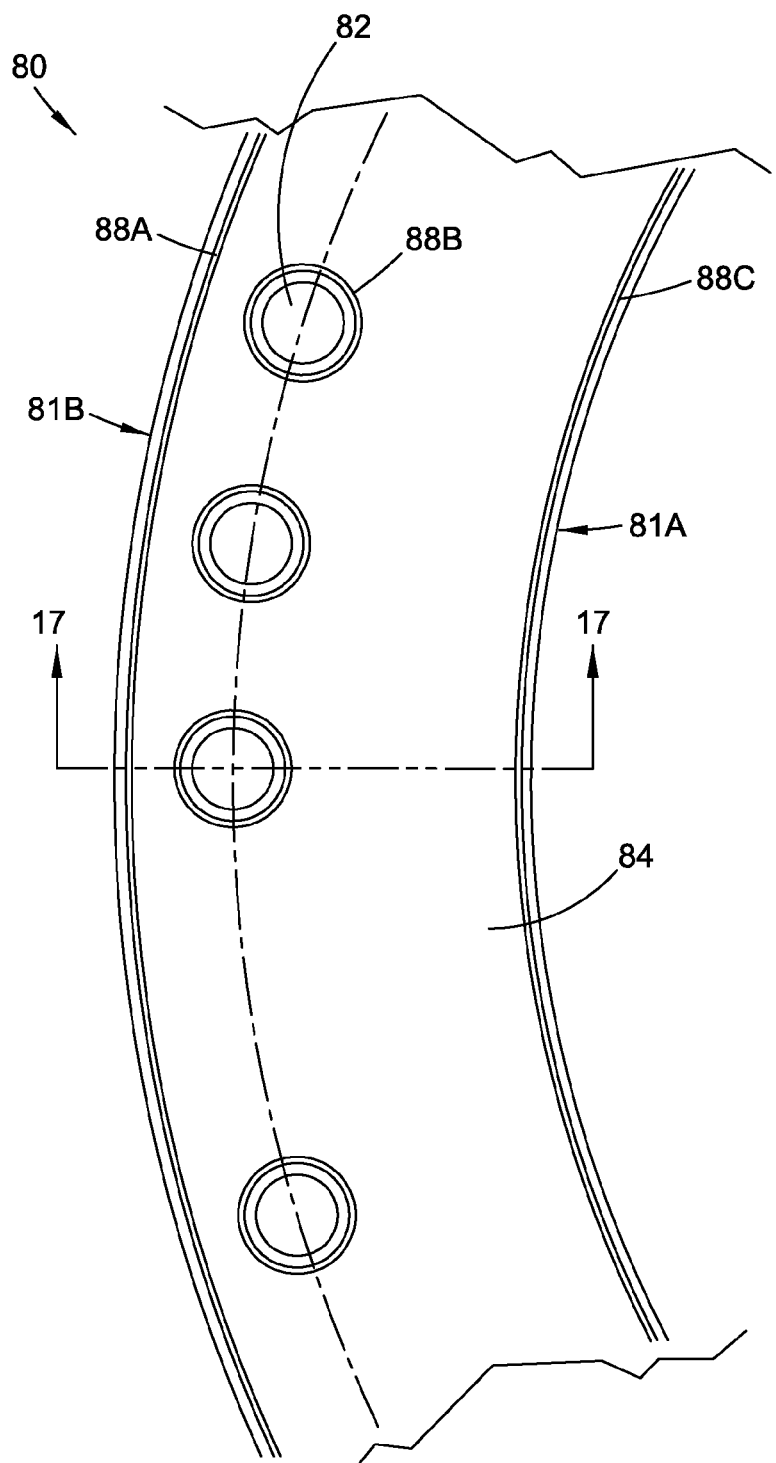
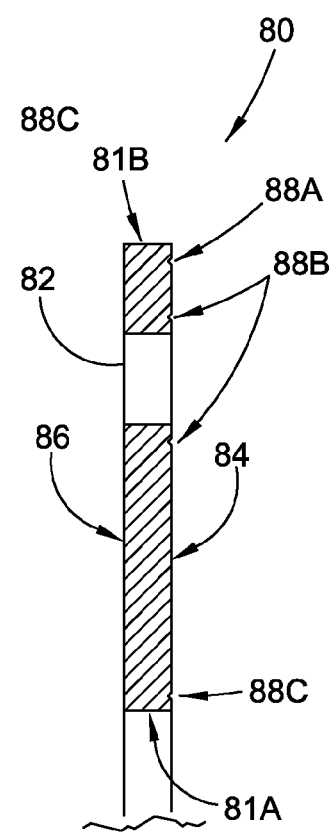
Fig. 16
Fig. 17

BRAZED SUPPORT RING

CROSS-REFERENCE TO RELATED APPLICATIONS

This application claims the benefit under 35 U.S.C. §119(e) of U.S. Provisional Application No. 61/214,671, filed Apr. 27, 2009.

FIELD OF THE INVENTION

The invention relates to torque converters, and more specifically to a torque converter having a brazed support ring for a clutch.

BACKGROUND OF THE INVENTION

Torque converters are well known in the art. Torque converters which include torque converter lock-up clutches, which mechanically couple the input to the output of the torque converter, are also known. In some torque converters, the lock up clutch is engaged by pressing a piston away from the pump and turbine, and directly against a cover of the torque converter.

In other torque converters, such as the one shown in FIG. 1, the lock up clutch is engaged by pressing the piston in a direction towards the pump and turbine of the torque converter. In such a scenario, a backing plate is required to provide the clutch with a support means to engage against. Torque converters which include such backing plates are also disclosed in U.S. Pat. No. 2,821,867 (Kelbel), U.S. Pat. No. 2,971,385 (Miller), U.S. Pat. No. 2,691,812 (Misch), and U.S. Pat. No. 2,640,373 (Jandasek). These prior art backing plates must be quite thick so that they have sufficient stiffness to ensure that they do not bend and can accordingly provide a support means for the engagement of a clutch.

Due to the large thickness, the backing plates can only be manufactured from certain manufacturing techniques, most commonly fine-blanking. Fine-blanking, however, is quite expensive due to the specialized equipment and tooling required to perform the blanking operation. U.S. Pat. No. 7,063,197 (Merkel et al.) discloses a backing plate having a smaller thickness than traditional backing plates so that fine-blanking is not necessary, but the plates in Merkel et al. require substantial and accurate bending and shaping. Further, the area on the Merkel et al. backing plate that is engagable against the clutch is substantially reduced in comparison to traditional backing plates.

Therefore, what is needed is a backing plate which does not require specialized fine-blanking equipment to manufacture, but which has sufficient stiffness and surface area to provide a support means for the engagement of a clutch.

BRIEF SUMMARY OF THE INVENTION

The present invention broadly comprises a support ring for a clutch for a torque converter comprising first and second laminations, wherein each of the first and second laminations includes first and second opposite surfaces, wherein the first surfaces of the first and second laminations are matingly engaged and affixed together, and the second surfaces of the first and second laminations form a pair of external, opposite surfaces of the support ring. In one embodiment, the first and second laminations are substantially identical. In another embodiment the first and second laminations are affixed by brazing the first surfaces of the first and second laminations together.

In one embodiment the first surfaces of the first and second laminations each further comprise at least one alignment hole, at least one protrusion, and wherein the at least one protrusion of the first lamination is engaged in the at least one alignment hole of the second lamination, and wherein the at least one protrusion of the second lamination is engaged in the at least one alignment hole of the first lamination. In a further embodiment, each of the at least one alignment holes comprises a plurality of alignment holes, and the alignment holes are all positioned at a common radial distance from a center of each of said first and second laminations, and wherein each of the at least one protrusion comprises a plurality of protrusions, and wherein the protrusions are also positioned at the common radial distance from the center of each of the first and second laminations.

In another embodiment, the alignment holes and the protrusions are equally spaced and alternatingly positioned about each of the first and second laminations. In yet another embodiment, each of the first and second laminations further comprise at least one bolt hole segment, wherein the at least one bolt hole segment in the first lamination is operatively arranged to align with the at least one bolt hole segment in the second lamination when the first and second rings are affixed, for forming at least one bolt hole in the support ring for receiving bolts for securing the support ring inside the torque converter.

The current invention also broadly comprises a method of making a support ring for a torque converter clutch including the steps of: (a) stamping a first lamination having first and second opposite surfaces, (b) stamping a second lamination having first and second opposite surfaces, (c) affixing the first lamination to the second lamination, wherein the first surfaces of the first and second laminations are matingly engaged together, and the second surfaces of the first and second laminations form a pair of external, opposite surfaces of the support ring. In another embodiment, prior to step (c), the method further includes (d) forming at least one protrusion on the first surface of the first lamination and on the first surface of the second lamination, (e) forming at least one alignment hole in the first surface of the first lamination and also in the first surface of the second lamination, and (f) engaging the at least one protrusion of the first lamination in the at least one alignment hole of the second lamination and the at least one protrusion of the second lamination in the at least one alignment hole of the first lamination.

In one embodiment, each of said at least one alignment hole comprises a plurality of alignment holes, and said alignment holes are all positioned at a common radial distance from a center of each of said first and second laminations, and wherein each of said at least one protrusion comprises a plurality of protrusions, wherein said protrusions are also positioned at said common radial distance from said center of each of said first and second laminations. In a further embodiment, the plurality of alignment holes and the plurality of protrusions are equally spaced and alternatingly positioned about each of the first and second laminations. In another embodiment, prior to step (f) a brazing paste is applied between the first surfaces of the first and second laminations, and wherein the first and second laminations are permanently affixed in step (c) by brazing.

In one embodiment, prior to step (f), the method of manufacturing a torque converter clutch further comprises the step of: (g) forming a plurality of bolt hole segments in each of the first and second laminations, and wherein the plurality of bolt hole segments in the first lamination aligns with the plurality of bolt hole segments in the second lamination for forming a plurality of bolt holes in the support ring for receiving bolts for securing the support ring inside of the torque converter. In yet another embodiment, prior to step (c), the method further comprises (h) forming at least one groove in the first surface of the first lamination, the second lamination, or the first and second laminations, for retaining excess brazing paste that is urged out from between the first and second laminations when the first surfaces of the first and second laminations are matingly engaged. In another embodiment, after step (c), the method further includes (i) machining or grinding said radially inner and outer edges of said support ring to remove said at least one groove from about said radially inner or outer edges of said support ring.

The current invention also broadly comprises a support ring for a torque converter including a first lamination affixed to a second lamination, wherein each of the first and second laminations includes a first surface, and wherein the first surfaces of the first and second laminations are matingly engaged together, wherein each of the first and second laminations include at least one bolt hole segment, at least one alignment hole, and at least one protrusion, wherein the at least one protrusion of the first lamination is engaged in the at least one alignment hole of the second lamination, and wherein the at least one protrusion of the second lamination is engaged in the at least one alignment hole of the first lamination, and wherein the at least one bolt hole segment in the first lamination aligns with the at least one bolt hole segment in the second lamination when the first and second laminations are matingly engaged for forming at least one bolt hole in the support ring for receiving bolts for securing the support ring inside of the torque converter.

In one embodiment the at least one bolt hole comprises a plurality of bolt holes, and the bolt holes are arranged about the support ring proximate a radially outer edge of the support ring. In another embodiment, the at least one alignment hole in each of the first and second laminations comprise a plurality of alignment holes in each of the first and second laminations, and wherein the at least one protrusion on each of the first and second laminations comprises a plurality of protrusions on each of the first and second laminations, wherein the bolt holes are arranged about the support ring at a first radial distance, and wherein the protrusions and the alignment holes are arranged about the support ring at a second radial distance, and wherein the second radial distance is located between the first radial distance and an inner diameter of the support ring. In yet another embodiment the first and second laminations are affixed by brazing, and the first surface of the first lamination includes at least one groove for retaining excess brazing paste, and the at least one groove is included proximate a radially inner edge of the first lamination, proximate a radially outer edge of the first lamination, about the at least one bolt hole segment, or any combination thereof. In yet another embodiment, the first surface of the second lamination also includes at least one groove proximate a radially inner edge of the second lamination, proximate a radially outer edge of the second lamination, about the at least one bolt hole segment of the second lamination, or any combination thereof.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 is a cross-sectional view of a torque converter including a prior art backing ring;

FIG. 2 is a front view of a first embodiment prior art clutch backing ring;

FIG. 3 is a front view of a second embodiment prior art clutch backing ring;

FIG. 4 is a cross-sectional view of a prior art clutch backing ring;

FIG. 5 is a perspective view of a current invention clutch support ring;

FIG. 6 is a front view of the support ring shown in FIG. 5;

FIG. 7 is a cross-sectional view of the support ring taken generally along line 7-7 in FIG. 6;

FIG. 8 is a perspective view of a current invention lamination;

FIG. 9 is a front view of the lamination shown in FIG. 8;

FIG. 10 is a cross-sectional view of the lamination taken generally along like 10-10 in FIG. 9;

FIG. 11 is an enlarged view of the area encircled in FIG. 10;

FIG. 12 is a perspective view of a second embodiment of a current invention clutch support ring;

FIG. 13 is a perspective view of a lamination according to a second embodiment of the current invention;

FIG. 14 is a front view of the lamination shown in FIG. 13;

FIG. 15 is a cross-sectional view of the lamination taken generally along line 15-15 in FIG. 14;

FIG. 16 is a partial view of a lamination according to a third embodiment of the current invention; and, FIG. 17 is a cross-sectional view of the lamination taken generally along line 17-17 in FIG. 16.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Referring now to the drawings, FIG. 1 illustrates prior art torque converter 100 including backing plate 102. Backing plate 102 is essentially a ring which is sufficiently thick to provide proper support for the plates of clutch 104 when the clutch is engaged. The clutch is engaged when piston 106 is urged toward pump 108 and turbine 110 of the torque converter. Backing plate 102 is secured to cover 112 of the torque converter by bolts 114. Only one bolt 114 is shown, but it should be appreciated that a plurality of such bolts are included about radially outer edge 118 of the backing plate.

FIGS. 2 and 3 show two examples of prior art backing plates 102A and 102B, respectively. FIG. 4 illustrates a representative cross-section of backing plate 102, which generally embodies any backing plate which secures to the torque converter by bolts through bolt holes. It should therefore be appreciated that FIG. 4 represents the cross-section of plates 102A and 102B when taken as designated by lines 4-4 in both FIGS. 2 and 3. That is, plates 102A and 102B are ring shaped and have a plurality of bolt holes 116 proximate to and about their radially outer edges or diameters 118 for bolting each support to the inside of a torque converter with bolts 114. It should be appreciated that, like torque converter 100 in FIG. 1, only the top half of the cross-section of the backing ring is shown in FIG. 4. The portion of the ring generally inward from the bolt holes is used to engage against and support clutch 104. That is, the area of the support ring generally between bolt holes 116 and radially inner edge or diameter 120 engages against and supports the clutch when the clutch is closed.

The examples of prior art plates in FIGS. 2 and 3 are included to demonstrate two of the near limitless possible arrangements of bolt holes 116. Specifically, plate 102A has ten groups of three holes each, while every third group of bolt holes in plate 102B consists of five holes, not three. It should be appreciated that many other arrangements of bolt holes are possible and within the scope of the current invention, and plates 102A and 102B are included as examples only. Furthermore, it should be recognized that the plates may not even be bolted to cover 112, but instead may be secured by some other means known in the art, such as welding, riveting, clamping, or the like.

It should also be recognized that despite the similarity of the cross-sections, actual dimensions of the different plates may vary. For example, before being turned and ground, the plates may have thickness from about 9 mm to about 14 mm. These thicknesses are difficult to manufacture from a conventional stamping operation, which typically stamps rings only about half that thick. It should be readily appreciated that the thickness of the backing plate is measured generally between the opposite faces of the ring through which bolt holes 116 are made.

One embodiment of current invention backing or support ring 10 is shown in FIGS. 5-7. Backing ring 10 is functionally similar to prior art ring 102, and generally replaces rings 102 in current invention torque converters. By functionally similar, we mean that support ring 10 is included in a torque converter to support a clutch when the clutch is engaged. Advantageously, like the prior art rings discussed supra, backing ring 10 may include different dimensions or arrangements of bolt holes or other securing means for securing backing ring 10 in a torque converter. Generally, any of the design choices discussed above with respect to prior art rings 102, including rings 102A and 102B, can be implemented by the current invention ring 10.

It can be seen that backing ring 10 differs from the prior art rings in that the backing ring comprises two laminations 14, matingly engaged together. The terminology "lamination" is used to refer to a ring-shaped structure that is a portion of the thickness of a support or backing plate. Accordingly, backing rings 10, when fully manufactured from two laminations (each lamination having one half of the total thickness), will have the same thicknesses as prior art rings. One of ordinary skill in the art should recognize that the thickness refers to the transverse distance between the two opposite surfaces 18. The laminations, and therefore backing ring, are preferably made from a metal with high stiffness, such as steel.

Like the prior art rings, backing ring 10 includes a plurality of bolt holes 12 about radially outer edge 11B of ring 10 for enabling the backing ring to be bolted to the inside of a torque converter. It should again be appreciated that other means besides bolts could be used to secure the backing ring to a torque converter, but that bolts are the preferred means.

In the shown embodiment, the current invention backing ring is created from affixing two laminations 14 together. Advantageously, laminations 14 only have to be half the thickness of support ring 10, and can therefore be more easily formed by conventional stamping processes without the need for fine-blanking. If not secured together, the two laminations would not exhibit sufficient stiffness to act as a backing ring, even if they were matingly pressed together. However, affixing the two laminations together results in a stiffness of ring 10 that approximates the same stiffness of a prior art ring of the same thickness. In a preferred embodiment, laminations 14 are permanently affixed by a brazing process, such as with a copper paste, or some other filler metal. The two laminations may be affixed by other means, such as riveting, but such processes would disrupt outer surface 18 of the backing ring so that it would not engage as effectively against a clutch plate.

Lamination 14 is shown in FIGS. 8-11. Referring to these Figures, as well as FIGS. 5-7 of support ring 10, it can be seen that lamination 14 includes opposite surfaces 16 and 18. Because surfaces 16 of two laminations are matingly engaged and affixed together to form the center of the support ring, surfaces 16 are generally referred to as the mating, interior, or inner surfaces. Oppositely, surfaces 18 form the outer visible surfaces of support ring 10, and are therefore referred to generally as the exterior, external, or outer surfaces of the laminations.

In the shown embodiment, lamination 14 includes five alignment holes 20 which are bored, punched, or stamped through the thickness of the ring. The term thickness refers to the transverse distance between surfaces 16 and 18. In some embodiments, it could be possible that alignment holes 20 are only a partial bore through the laminations in interior surface 16. Surface 16 includes five alignment protrusions 22 which generally resemble cylindrical extrusions or projections from the interior surface. Protrusions 22 preferably have a smaller diameter than holes 20, so that the projections can easily fit in the holes without interference, because the holes and protrusions are included only to align the laminations, not to hold the laminations together. A clearance fit between the holes 20 and projections 22 is preferred because it enables the protrusions and alignment holes to easily engage, while limiting the amount of looseness or play between the two laminations when they are engaged.

In addition to alignment holes 20, outer surface 18 includes five divots 24, directly opposite the protrusions. In a preferred embodiment, the protrusions are formed as a result of a stamp, punch, ram or similar mechanism deforming the divots into the outer surfaces. The laminations include bolt hole segments 26, which each comprise a portion of each bolt hole 12 of the support ring. That is, the bolt hole segments are holes through each lamination, and together form the bolt holes through the support ring when the bolt hole segments are aligned. That is, when the laminations are affixed together, the bolt hole segments in a first lamination align with the bolt hole segments in the second lamination, to form bolt holes 12 through the thickness of support ring 10. The alignment holes, bolt hole segments, divots, and protrusions may be formed simultaneously from the same stamping process, or sequentially from individual stamping operations, as desired. Furthermore, a mill, lathe, or other machines could be used to form, shape, alter, or refine the laminations or their components after the rings are stamped.

Referring back to FIG. 7, it can be seen that inner surfaces 16 of two laminations 14 are affixed so that only the outer surfaces 18 are visible. Brazing paste, for example, would be applied between the inner surfaces 16 of the laminations, and then the inner surfaces would be matingly engaged and bonded together by melting the brazing paste to form a metallurgical bond between the two laminations.

It can also be seen that protrusions 22 and holes 20 are included to provide proper alignment of the two halves of support ring 10. By facing the two inner surfaces toward each other, aligning protrusions 22 of a first lamination with holes 20 of a second lamination, then matingly engaging inner surfaces 16 of two laminations 14, the laminations can be held in alignment for the brazing process. That is, when protrusions 22 are engaged within holes 20, the inner and outer edges or diameters 15A and 15B, respectively, of the laminations align to form inner and outer edges 11A and 11B of the backing ring, and also so that the bolt hole segments 26 align to form bolt holes 12.

Advantageously, in a preferred embodiment, the two laminations are identical, so that tooling for only a single part is required. Further, two incompatible or incorrect rings can not be accidentally joined during assembly of ring 10, as any selected pair of laminations can be used to properly manufacture support ring 10. In the shown embodiment, the protrusions and holes are also alternated at equal intervals about the inner surfaces of the laminations so that aligning any hole 20 with any protrusion 22 will align all of the holes and protrusions. It should be appreciated that the two laminations do not necessarily have to be identical. That is, one lamination could include just protrusions, while the other lamination includes just alignment holes. This would require additional tooling and slightly complicate the assembly process, but would not significantly affect the performance of a support ring made from such a pair of different laminations.

It can be seen that all bolt holes 12 (and thus bolt hole segments 26) are located at the same radial distance from the center of the support ring, as indicated by reference circle 28, which is concentric to inner and outer edges or diameters 11A and 11B, respectively, of the support ring. Alignment holes 20, protrusions 22, and divots 24, are also at a same radial distance, as indicated by reference circle 30, which is also concentric to the inner and outer edges of the ring. The bolt hole segments should be aligned along the same reference circle, such as reference circle 30 to ensure that bolt holes 12 are properly formed from bolt hole segments 26. Likewise, alignment holes 20 should be on the same concentric reference circle as protrusions 22 so that the inner diameter, outer diameter, and bolt hole segments of the two laminations properly align.

In the shown embodiment, reference circles 28 and 30 are offset with respect to each other. Specifically, reference circle 30, and therefore alignment holes 20, protrusions 22, and divots 24, are radially inward from reference circle 28, bolt holes 12, and bolt hole segments 26. Advantageously, offsetting the two reference circles with respect to each other eliminates the chance of accidentally inserting protrusions 22 into bolt hole segments 26, instead of alignment holes 20, because doing so would misalign the rest of the protrusions and alignment holes, and such a misalignment would be easily noticed by a machinist or assembly worker.

FIG. 12 illustrates backing ring 50, which resembles ring 10 in manufacturing process and structure, but prior art ring 102B in the arrangement of bolt holes. Like ring 102B, ring 50 is included to provide an alternate embodiment of the current invention ring which has a different arrangement of the bolt holes. Ring 50 is made from two laminations 54 affixed together. Referring to FIGS. 13-15, it can be seen that laminations 54 generally resemble laminations 14, as the laminations 54 and 14 include all of the same components: opposite surfaces, inner and outer edges or diameters, protrusions, alignment holes, bolt hole segments, and divots. However, laminations 54 exhibit a different layout of bolt hole segments, protrusions, divots, and alignment holes. In the shown embodiment, only two alignment holes 60 are included, spaced 180 degrees apart from each other. Two protrusions 62 from inner surface 56 are also included corresponding to two divots 64 in outer surface 58. In the shown embodiment, the protrusions are also spaced 180 degrees from each other. The protrusions and alignment holes are placed alternatingly about the support ring, and spaced ninety degrees apart, so that aligning any protrusion of a first lamination with any hole of a second lamination will result in all holes and all protrusions aligning.

FIG. 16 shows a portion of a third embodiment of a support ring according to the current invention. Specifically, lamination 80 differs from laminations 14 and 54 because it includes grooves 88A-C in inner surface 84. Groove 88A is included proximate the radially outer edge or diameter 81B about the support ring, groove 88B is included about each of the bolt hole segments 82, and groove 88C is proximate the radially inner edge or diameter 81A about the support ring. The grooves are included to collect and retain excess brazing paste, so that the paste does not pool about the inner and outer edges 81A and 81B as the liquefied paste is urged out from between the laminations when they are matingly engaged together and undergoing the brazing process.

Because the grooves will slightly reduce the strength of the ring, it may be preferable to machine or grind down the inner and outer edges 81A and 81B after laminations 80 are affixed, to remove the grooves. Advantageously, grooves 88B, which are proximate to bolt hole segments 82, should not significantly affect the stiffness of a support ring made from laminations 80, as the laminations are also clamped together by bolts inserted through the bolt hole segments. It should be appreciated that outer surface 86 substantially resembles the outer surfaces of laminations 14 and/or 54, and the bolt hole segments 82 substantially resemble the bolt hole segments of laminations 14 and/or 54. Thus, the bolt hole segments could be arranged in any desired manner, as discussed with respect to each of the other embodiments of laminations.

Although examples of support rings manufactured from only two laminations are provided, it should be recognized that even thicker support rings could be manufactured from more than two laminations. For example, if a support ring comprised three identical laminations, the first two laminations would engage exactly as previously described. The mating or interior surface of third lamination could then engage against either of the two outer surfaces of the two engaged laminations. Specifically, the protrusions on the third lamination would engage in the alignment holes of the second lamination. Thus, the alignment holes in the second lamination would be engaged from one side by protrusions from the first lamination and from the opposite side by protrusions of the third lamination. Of course, the protrusions could only engage at most one half of the distance through the alignment holes, or else the protrusions from the first and third laminations would interfere with each other, and the surfaces of the laminations would not be able to matingly engage. In such an arrangement, the alignment holes in the third lamination would not engage with any protrusions. Alternatively, just the first and third laminations could be made identical, and the second lamination could include two mating surfaces.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A support ring for a torque converter comprising:
   a first lamination including:
      a first outer edge;
      at least one first surface facing in a first axial direction orthogonal to a radial direction; and,
      a second surface facing in a second axial direction, opposite the first axial direction; and,
   a second lamination including:
      a second outer edge;
      at least one third surface facing in the second axial direction; and,
      a fourth surface facing in the first axial direction, wherein:
         the first and second outer edges are aligned in the first or second axial direction;
         said at least one first and third surfaces are matingly engaged and affixed together by a metallurgical bond between the at least one first and third surfaces;
         said second and fourth surfaces form a pair of external surfaces of said support ring;
         said at least one first and third surfaces each further comprise:
            at least one alignment hole; and,
            at least one protrusion;
         said at least one protrusion of said first lamination is engaged in said at least one alignment hole of said second lamination;
         said at least one protrusion of said second lamination is engaged in said at least one alignment hole of said first lamination;
         each of said first and second laminations further comprise at least one bolt hole segment; and,
         said at least one bolt hole segment in said first lamination is operatively arranged to align with said at least one bolt hole segment in said second lamination when said first and second laminations are affixed together, for forming at least one bolt hole in said support ring for receiving bolts for securing said support ring inside said torque converter.

2. The support ring recited in claim 1 wherein said first and second laminations are substantially identical.

3. The support ring recited in claim 1 wherein said first and second laminations are affixed by brazing said at least one first and third surfaces together.

4. The support ring recited in claim 1 wherein each of said at least one alignment hole comprises a plurality of alignment holes, and said alignment holes are all positioned at a common radial distance from a center of each of said first and second laminations, and wherein each of said at least one protrusion comprises a plurality of protrusions, wherein said protrusions are also positioned at said common radial distance from said center of each of said first and second laminations.

5. The support ring recited in claim 4 wherein said alignment holes and said protrusions are equally spaced and alternatingly positioned about each of said first and second laminations.

6. A torque converter clutch including a piston plate and the support plate recited in claim 1.

7. A torque converter including:
   a cover;
   a pump nonrotatably connected to the cover;
   a turbine; and,
   the clutch recited in claim 6, wherein:
      the support ring is nonrotatably connected to the cover; and,
      the piston is arranged to displace toward the support ring to close the clutch.

8. A method of making a support ring for a torque converter clutch comprising the steps of:
   stamping a first lamination including:
      a first outer edge;
      at least one first surface facing in a first axial direction orthogonal to a radial direction; and,
      a second surface facing in a second axial direction, opposite the first axial direction; and,
   stamping a second lamination including:
      a second outer edge;
      at least one third surface facing in the second axial direction; and,
      a fourth surface facing in the first axial direction;
   facing the at least one first and third surfaces in first and second opposite axial directions, respectively;
   aligning the at least one first and third surfaces in a radial direction orthogonal to the first and second axial directions;
   aligning the first and second outer edges in the first or second axial direction;
   forming a pair of external, opposite surfaces of said support ring with the second and fourth surfaces;
   matingly engaging the at least one first and third surfaces; and
   affixing said first lamination to said second lamination using a metallurgical bond between the at least one first and third surfaces;
   prior to affixing said first lamination to said second lamination, said method further comprises the steps of:
      forming at least one respective protrusion on said at least one first and third surfaces, respectively;
      forming at least one respective alignment hole in said at least one first and third surfaces, respectively; and
      engaging said at least one respective protrusion of said first lamination in said at least one respective alignment hole of said second lamination and said at least one respective protrusion of said second lamination in said at least one respective alignment hole of said first lamination;
   each of said at least one respective alignment hole comprises a plurality of alignment holes;
   said alignment holes are all positioned at a common radial distance from a center of each of said first and second laminations;
   each of said at least one respective protrusion comprises a plurality of protrusions;
   said protrusions are also positioned at said common radial distance from said center of each of said first and second laminations;
   said plurality of alignment holes and said plurality of protrusions are equally spaced and alternatingly positioned about each of said first and second laminations;
   prior to engaging said at least one respective protrusion of said first lamination in said at least one respective alignment hole of said second lamination and said at least one respective protrusion, said method further comprises:
  forming a plurality of bolt hole segments through each of said first and second laminations; and
  said plurality of bolt hole segments in said first lamination aligns with said plurality of bolt hole segments in said second lamination for forming a plurality of bolt holes through said support ring for receiving bolts for securing said support ring inside of said torque converter.

9. The method recited in claim 8 wherein prior to engaging said at least one respective protrusion of said first lamination in said at least one respective alignment hole of said second lamination and said at least one respective protrusion, the method further comprises applying a brazing paste between said at least one first and third surfaces, wherein affixing said first lamination to said second lamination using a metallurgical bond includes permanently affixing the at least one first surface to the at least one third surface by brazing.

10. The method recited in claim 9 wherein prior to engaging said at least one respective protrusion of said first lamination in said at least one respective alignment hole of said second lamination and said at least one respective protrusion, said method further comprises:
  forming at least one groove in one or both of said at least one first and third surfaces for retaining excess brazing paste that is urged out from between said first and second laminations when said at least one first and third surfaces are matingly engaged.

11. The method recited in claim 10 wherein after affixing said first lamination to said second lamination using a metallurgical bond, said method further comprises: machining or grinding radially inner or outer edges of said support ring to remove said at least one groove from about said radially inner or outer edges of said support ring.

* * * * *